United States Patent [19]
Clowes et al.

[11] 3,742,341
[45] June 26, 1973

[54] INDUCTIVELY COUPLED METAL DETECTOR ARRANGEMENT

[75] Inventors: Garth A. Clowes, Palos Verdes, Calif.; Masamitsu Nagaoka, Tokyo, Japan

[73] Assignee: Entex Industries, Inc., Carson, Calif.

[22] Filed: Aug. 16, 1971

[21] Appl. No.: 172,200

[52] U.S. Cl............................ 324/3, 324/6, 324/67
[51] Int. Cl.............................................. G01v 3/10
[58] Field of Search ....................... 324/3, 6, 41, 67

[56] References Cited
UNITED STATES PATENTS

| | | | |
|---|---|---|---|
| 2,242,312 | 5/1941 | Machts | 324/3 |
| 2,651,021 | 9/1953 | Hays | 324/52 |
| 3,418,572 | 12/1968 | Humphreys | 324/67 |
| 3,436,649 | 4/1969 | Takechi et al. | 324/41 |
| 3,652,928 | 3/1972 | Mansfield | 324/41 X |
| 3,052,837 | 9/1962 | Arbogast et al. | 324/3 |
| 3,601,691 | 8/1971 | Gardiner | 324/41 X |

OTHER PUBLICATIONS

Green; Charles, Gold Grabber Radio–TV Experimenter, Aug., Sept. 1968, pp. 41–44

*Primary Examiner*—Gerard R. Strecker
*Attorney*—Don B. Finkelstein et al.

[57] ABSTRACT

A metal detector arrangement for detecting the presence of a metal object in proximity thereto. A case means is provided in which there is a cavity. An electrically operated detector circuit is positioned within the cavity and the detector circuit generally comprises a search coil connected to an oscillator. The oscillator has a tank circuit and the inductor of the tank circuit is connected to the primary of the transformer. The search coil is connected to the secondary of the transformer. The oscillator generates an output at a preset frequency. When a metal object is in proximity to the metal detector the impedance to the signal radiated by the search coil is changed thereby changing the inductance of the tank circuit. The change in inductance of the tank circuit in the presence of a metal object raises the frequency of the oscillator output signal. A receiver coil is positioned within the search coil and receives the radiated signal from the search coil. The receiver coil is connected to an amplifier and the response of the amplifier is such that the increase in frequency of the radiated oscillator output signal changes the magnitude of the amplifier output signal. An indicator, such as a light bulb, is coupled to the amplifier through a switch means and the light bulb changes in intensity in proportion to the change in the magnitude of the amplifier output signal. The switch means turns off the indicator for the amplifier output having a preselected magnitude. A sensitivity control means is also provided to increase the magnitude of the amplifier output signal for the condition of the presence of a given mass of metal at a given distance from the detector and, thus, provide a variable sensitivity to aid in the detection of very small metal objects.

11 Claims, 14 Drawing Figures

3,742,341

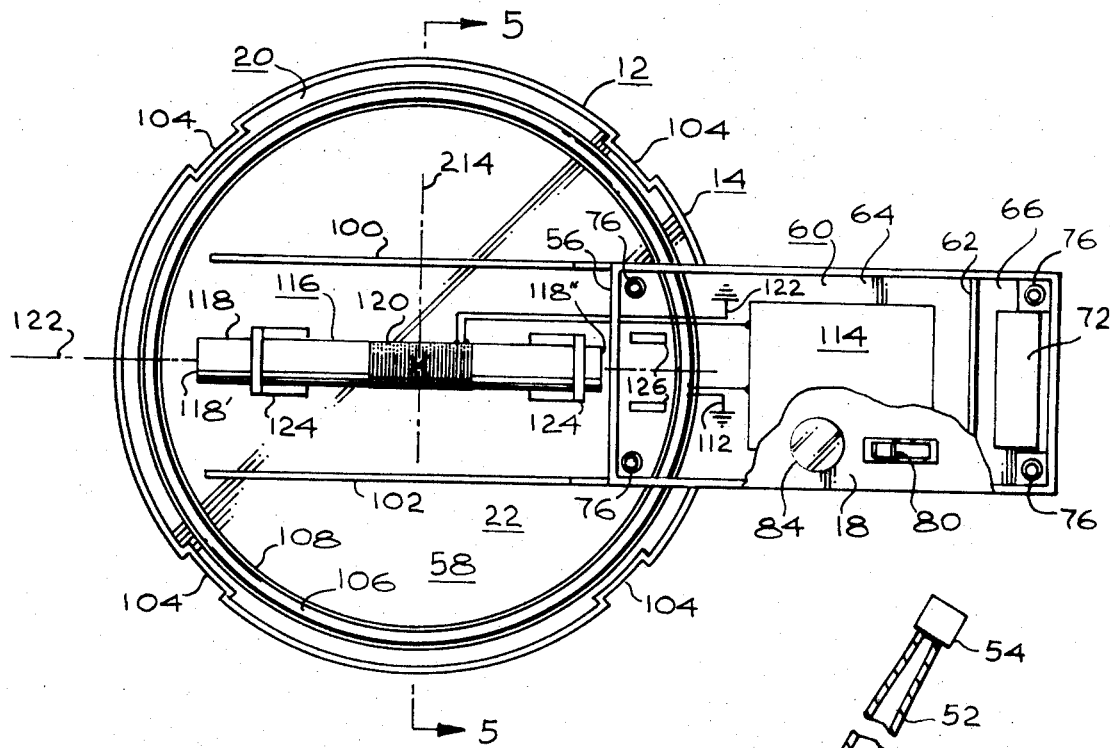

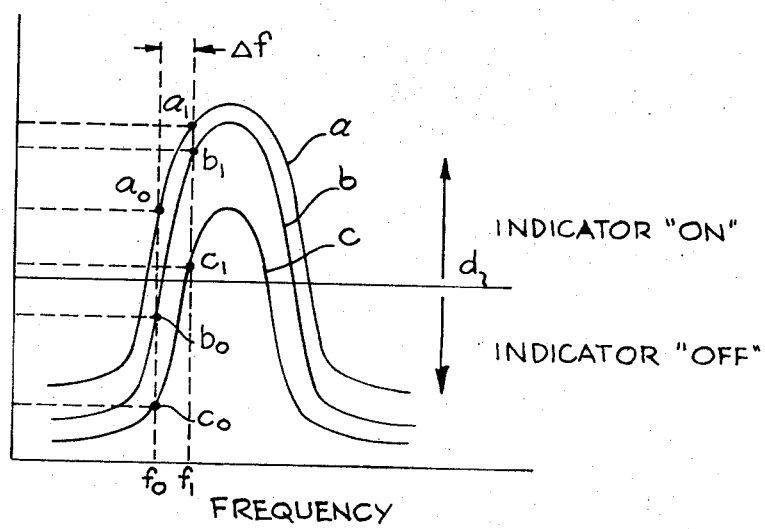
Fig. 8
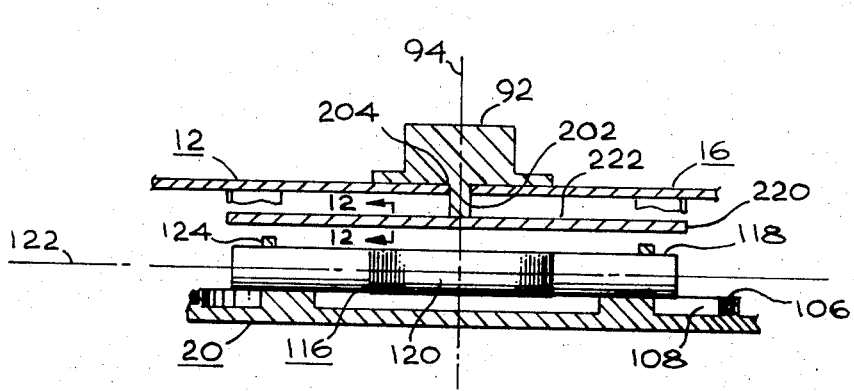
Fig. 11
Fig. 12
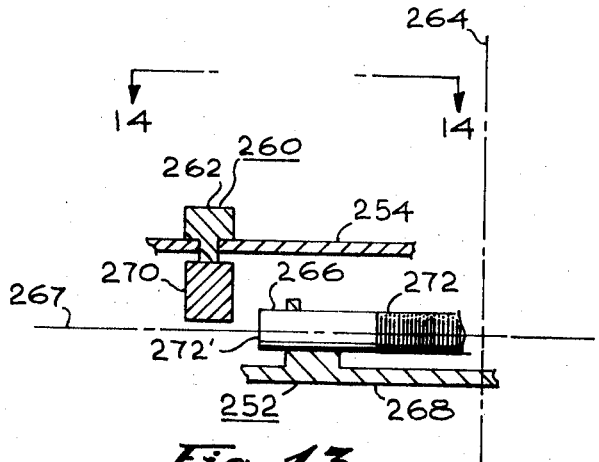
Fig. 13
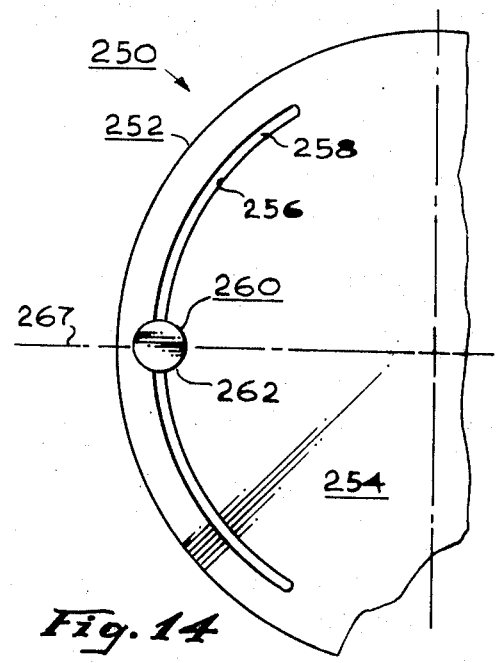
Fig. 14

INDUCTIVELY COUPLED METAL DETECTOR ARRANGEMENT

BACKGROUND OF THE INVENTION

1. Field of the Invention

This invention relates to the metal detector art and more particularly, to an improved inexpensive metal detector arrangement.

2. Background of the Invention

Metal detectors utilized in the past have often been comparatively expensive and complex devices. As such, their utilization by large numbers of the public has been severely limited. For example, in addition to the problem of finding lost metal objects at the beach or in other outdoor areas, there is also an industrial need for detecting the presence of metal objects in walls of buildings, or the like. If it is desired to drive a nail into a wall it is often desired to have the nail hit a stud rather than merely be secured in the plaster or dry wall covering. Since the studs in a wall are generally nailed to various cross members, detecting the presence of the nails will detect the location of the studs and/or the cross members. Additionally, it is often desirable to locate the presence of pipes or other conduits that are sealed in walls, floors or ceilings of a building. Conventional metal detectors have often been too expensive an/or complicated to operate to allow utilization thereof by a large number of people who could profitably utilize same.

It is also often desirable to detect metal objects located beneath a body of water. For example, skin and/or scuba divers are often searching for treasure or other metallic remnants that may be at the bottom of lakes, rivers, streams or oceans. Completely waterproof metal detectors are even more expensive than those utilized in dry areas only. Further, a visual light source such as visual electromagnetic radiation is often desired as the indicating signal to indicate the presence of a metal object in proximity to the metal detector as opposed to the more commonly utilized meter. In underwater metal detection such a visual signal has been long desired as the most utilitarian type of indicator.

Accordingly, it has long been desirable to provide an inexpensive and reliable metal detector that may be utilized equally well on land as well as underwater.

SUMMARY OF THE INVENTION

Accordingly, it is an object of the present invention to provide an improved metal detector arrangement.

It is another object of the present invention to provide an improved metal detector arrangement that is comparatively inexpensive to fabricate and comparatively easily operated.

It is another object of this invention to provide a comparatively lightweight metal detector arrangement that may be easily held by one hand in all positions around the utilizer.

It is yet another object of the present invention to provide an improved, inexpensive and lightweight metal detector arrangement that may be conveniently encapsulated in a substantially waterproof package to allow utilization underwater.

The above and other objects of the present invention are achieved, according to a preferred embodiment of the present invention, by providing a case means that has walls defining a cavity. In the preferred embodiment of the invention, the walls divide the cavity into a coil portion and a circuit portion.

An electrically operated detector circuit is mounted in the cavity of the case means and is preferably electrically operated by a source of electrical energy such as battery or the like. This is preferred to allow complete mobility of utilization of the metal detector arrangement. The electrically operated detector circuit generally comprises an oscillator for generating output signals having a frequency in a preselected bandwidth. The frequency of the output signal is controlled by a tank circuit. A search coil means is connected to the oscillator and radiates the output signal to regions external the case means. The search coil means is connected to the inductor of the tank circuit and in the presence of a metal object external the case means there is an electromagnetic coupling between the search coil and the metal object which changes the inductance of the tank circuit and thereby changes the frequency of the signal generated by the oscillator. In general, the presence of a metal increases the frequency of the oscillator output signal.

A receiver coil means is part of the electrically operated detector circuit and is positioned within the cavity and, preferably, within the plane of the search coil. The receiver coil means is generally wound on a high permeability core, such as a soft iron core. The receiver coil means receives the signal radiated by the search coil means and is connected to a tuned amplifier. Changes in the frequency of the oscillator output signal change the magnitude of the amplifier output signal proportionally. Thus, the presence of a metal object in proximity to the metal detector provides a changes in the magnitude of the amplifier output signal.

A switch means is connected to the amplifier for receiving the amplifier output signal and the switch means controls an indicator means which, in a preferred embodiment of the invention, is a light bulb. The switch means is designed to block the amplifier output signal from the light bulb for the oscillator signal at or below a preselected magnitude thereof to prevent energizing thereof but allows the indicator to be energized when the amplifier output signal changes from the preselected magnitude to greater magnitudes. The greater the deviation of the amplifier output signal from the preselected value, the greater the indicator is energized and, consequently, the more intense the light.

A sensitivity control means is provided adjacent to the receiver coil. The sensitivity control means, in the preferred embodiment of the invention, allows coupling of more of the search coil signal radiated energy into the core of the receiver coil in its most sensitive position and decreases the coupling of the energy into the core of the receiver coil in the least sensitive position.

The search coil, the receiver coil and core, and the sensitivity control are preferably positioned in the coil portion of the cavity and the rest of the circuitry associated with operation of the electrically operated detector circuit, including the source of electrical energy such as the batteries, is preferably positioned within the circuit portion of the cavity.

A handle means is coupled to the case means and, in the preferred embodiment of the invention, the handle means comprises a palm grippable portion coupled to the case means and an elongated rod-like member that is detachably coupled to the case means. For operating the metal detector at a close position, the rod-like member may be removed and the unit gripped by the palm grip. For providing operation of the unit at further distances away from the utilizer, the rod-like handle may be detachably coupled to the case and, thus, the metal detector may be supported at positions corresponding to the length of the rod-like member.

BRIEF DESCRIPTION OF THE DRAWINGS

The above and other embodiments of the present invention may be more fully understood from the following detailed description taken together with the accompanying drawings wherein similar reference characters refer to similar elements throughout and in which:

FIG. 3 is a sectional view taken along the line 3—3 of FIG. 1;

FIG. 4 is a top view of the embodiment shown in FIG. 1 illustrating the internal structure of the present invention;

FIG. 8 is a graphical representation of the response curve of the amplifier of the present invention;

FIGS. 9 and 10 illustrate the structure associated with the preferred form of sensitivity control useful in the practice of the present invention;

FIGS. 11 and 12 illustrate another embodiment of the present invention; and

FIGS. 13 and 14 illustrate another embodiment of the present invention.

DESCRIPTION OF THE PREFERRED EMBODIMENTS

Figure 1:
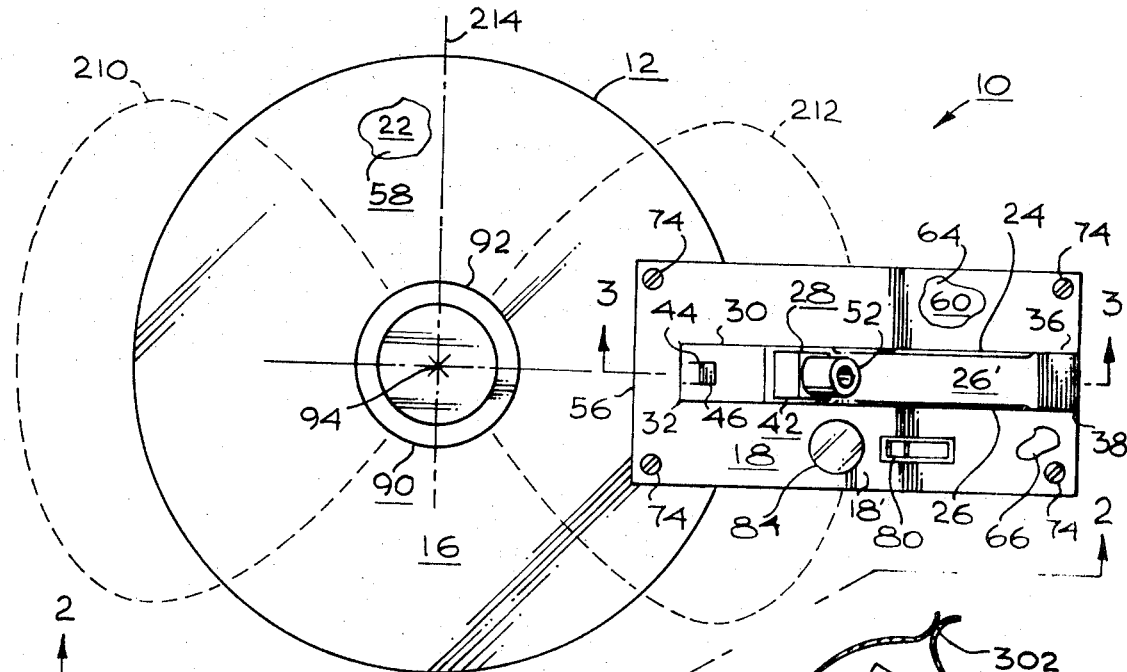
FIG. 1 is a top view of a preferred embodiment of the present invention.
Figure 2:
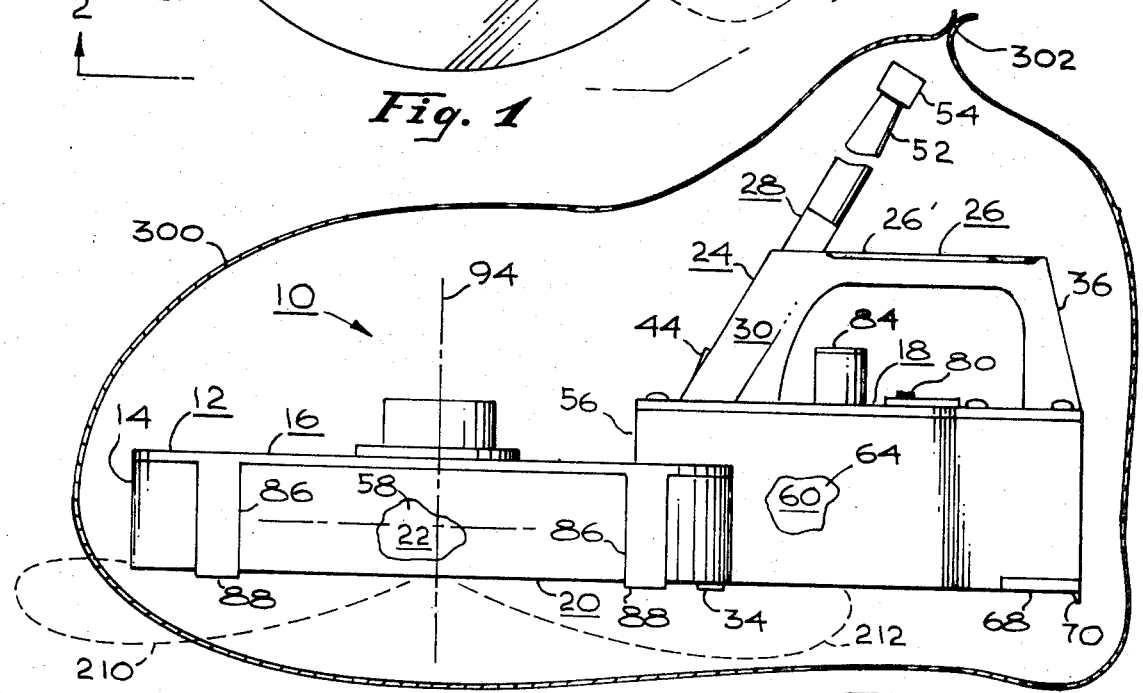
FIG. 2 is a side view taken along the line 2—2 of FIG. 1.

Referring now to the drawings, and in particular FIGS. 1, 2 and 3, there is illustrated the structure associated with a preferred embodiment of the present invention, generally designated 10. As shown, there is case means 12 having peripheral walls 14, top walls 16 and 18 and a bottom wall 20, all defining a cavity 22. The peripheral wall 14, top walls 16 and 18 and bottom wall 20 are all transparent to electromagnetic radiation in at least a preselected bandwidth.

A handle means 24 is coupled to the top wall 18 and, in preferred embodiments of the present invention, it is detachably coupled thereto. As shown in greater detail on FIG. 3, the handle means 24 generaly comprises a palm grip member 26 and an elongated rod-like member 28 that, in preferred embodiments of the present invention, is detachably coupled to the palm grip member 26. The palm grip member 26 is generally U-shaped in cross-section and has a forward leg 30 extending through a corresponding slot 32 in the top wall 18 and the forward leg 30 has tab portions 34 extending through the bottom wall 20. The palm grip member 26 also has a rear leg 36 extending through a corresponding slot 38 in top wall 18 and the rear leg 36 is provided with a tab portion 40 for retention therein. In the preferred embodiment of the present invention, as illustrated in the drawing, the palm grip portion 26 is detachably coupled to the case means 12 and may be withdrawn by resiliently depressing the forward leg 30 and rear leg 36 so that the tabs 34 and 40, respectively, may be withdrawn through the bottom wall 20 and top wall 18, as required. In utilizing the palm grip member 26 it will be appreciated that the center section 26' thereof may be gripped by the nand and the metal detector 10 supported in close proximity to the utilizer thereof.

However, when it is desired to utilize the metal detector 10 at positions remote from the utilizer, the rod-like member 28 may be installed. As shown, the rod-like member 28 is comprised of a base portion 42 that may generally comprise a box section and be provided with a tab 44 extending through a slot 46 in the forward leg 30 of the palm grip member 26 in regions above the top wall 18 of the case means 12. The base portion 42 is provided with a tubular extension 48 at the upper end 50 thereof and a tubular rod 52 may be frictionally retained thereon and be provided with a gripping portion 54 at the remote end thereof. Thus, when it is desired to support the metal detector 10 in position remote from the utilizer, the base portion 42 of the elongated rod-like member 28 may be inserted in the palm grip member 26 and the tubular rod 52 inserted thereon. The length of the tubular rod 52 may be selected as desired by any given application.

The case means 12 may also be provided with a first intermediate wall 56 that divides the cavity 22 into a coil portion 58 and a circuit portion 60. Additionally, as shown on FIG. 3, a second intermediate wall 62 may be provided to divide the circuit portion 60 into a components section 64 and a battery section 66. A door member 68 may be detachably coupled to the bottom wall 20 by tab 68' thereon engaging the bottom wall 20 and by tab 70 on peripheral wall 14. The door 68 is preferably detachably coupled in the case means 12 to allow easy replacement of a source of electrical energy, such as a battery means 72, that is positioned in the battery section 66 of the circuit portion 60 of the cavity 22.

The top wall 18 may be retained on the case means 12 by a plurality of screws 74 extending therethrough and threadingly engaging posts 76 coupled to the bottom wall 20 of the case means 12. Thus, the entire top wall 18 may be removed from the case 12 by removing the four screws 74. An ON-OFF switch 80 is coupled to external surface 18' of top wall 18 of the case means 12 to allow operation thereof from regions external the cavity 22 and an indicator means 84 is also coupled to the top wall 18 on the external surface 18' thereof to allow viewing thereof from regions external the cavity 22. The ON-OFF switch 80 and indicator means 84 are described in greater detail below.

The top wall 16 is, in the preferred embodiments of the present invention, detachably secured within the case means 12 by tabs 86 that frictionally engage corresponding indentations in the peripheral walls 14 and have flanges 88 that frictionally engage the bottom wall 20. In the preferred embodiment of the present invention the bottom wall 20, peripheral wall 14, first intermediate wall 56 and second intermediate wall 62 are unitary construction and preferably a molded plastic. The top wall 16 and top wall 18 as well as the handle means 24 are also preferably fabricated from a plastic and, where required, are provided with the needed degree of flexibility and resiliency to allow the detachable coupling of the palm grip 26, rod-like means 28 and top wall 16 in the case means 12.

The metal detector 10 is also provided with a sensitivity control means 90 having a knob portion that is rotatably mounted on the top wall 16 for rotation about an axis 94. Operation of the sensitivity control 90 is described below in greater detail.

Figure 5:
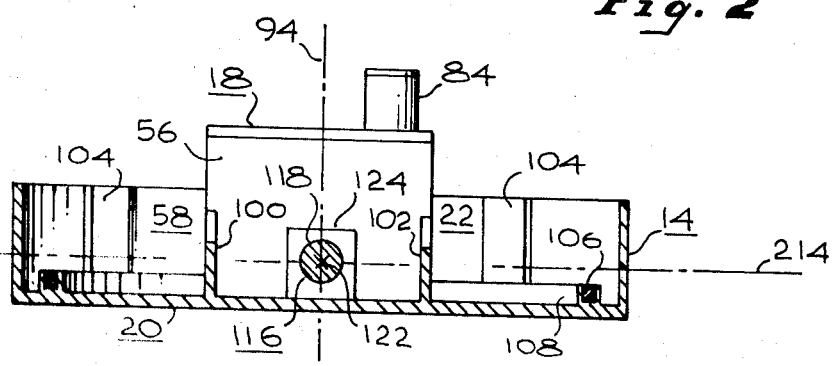
FIG. 5 is a section view along the line 5—5 of FIG. 4.

FIGS. 4 and 5 illustrate the internal structure of the preferred embodiment 10 of the present invention. For clarity, the top wall 16 has been removed and the top wall 18 has been partially broken away.

In the coil portion 58 of the cavity 22, there may be provided tapered ribs 100 and 102 extending outwardly from the intermediate wall 56 and, if desired, may be formed integral with the bottom wall 20. The ribs 100 and 102 provide additional structural rigidity to the coil portion 58 of the cavity 22. Indentations 104 are provided around the peripheral walls 14 of the coil portion 58 of the cavity 22 for accepting the tabs 88 of the top wall 16. Thus, the top wall 16 snaps into place and is retained in the case means 12 by the mutual engagement of the tabs 88 with the indentations 104.

A search coil 106 is positioned adjacent the interior of peripheral walls 14 in the coil portion 58 of the cavity 22 and, in the preferred embodiment of the present invention, it is retained in place by a generally U-shaped channel member 108 extending around the interior of the peripheral wall 14. The search coil 106 is preferably comprised of one or more turns of a shielded wire wherein the shield is grounded, as shown at 112. The search coil 106 is connected to a circuit board 114 upon which are mounted the components of the electrically operated detector circuit (omitted in FIG. 4 for clarity). As shown on FIG. 4, the search coil 106 may be generally considered as a loop antenna having an axis 94.

A receiver coil means 116 is positioned within the coil portion 58 of the cavity 22 and is generally comprised of an electrically conductive core 118, having a first permeability for electromagnetic radiation in the preselected bandwidth, upon which is wound the receiver coil 120 that is grounded at 122 and connected into the circuit board 114. The core 118 may be fabricated of, for example, soft iron and has a first end 118′ and a second end 118″. The receiver coil is wound on the core 118 intermediate the first end 118′ and the second end 118″. The receiver coil means 116 is aligned along a second axis 122 that, in the preferred embodiment of the present invention, is perpendicular to the first axis 94 and lies substantially in the plane of the search coil 106. The axis 94 of the search coil 106 is, in the preferred embodiment of the present invention, equidistant from the first end 118′ and the second end 118″ of the coil 118. The receiver coil means 116 may be supported in the cavity 22 by means of supports 124 that may be fabricated integrally with the bottom wall 20.

The circuit board 114 is preferably positioned in the circuit portion 60 of the cavity 22. Slots 126 may be provided in the bottom wall 20 in the circuit portion 60 of the cavity 22 to accept the tabs 34 of forward legs 30 of the palm grip 26 of the handle means 24 in order to provide a more secure attachment thereof.

Figure 6:
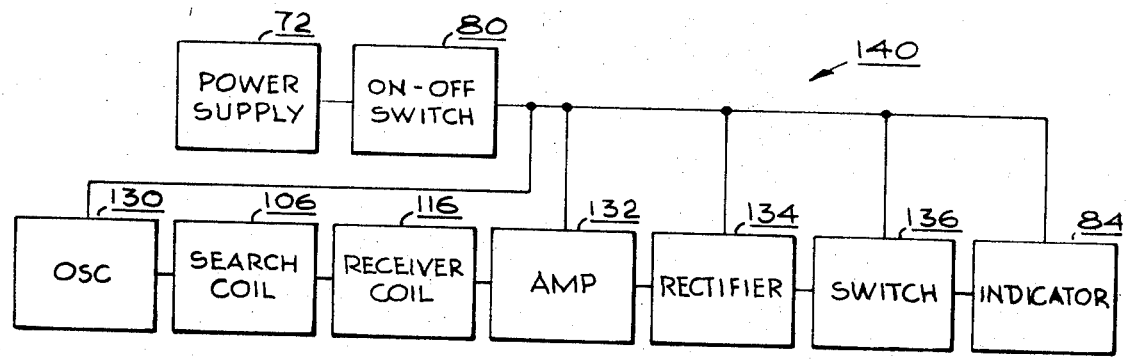
FIG. 6 is a block diagram of a preferred electrically operated detector circuit useful in the practice of the present invention.

FIGS. 6 illustrates a block diagram of the electrically operated detector circuit 140 for the preferred embodiment of the present invention. As shown, there is an oscillator 130 that generates a signal at a preset frequency, to, for the condition of no metal object in proximity to the metal detector arrangement 10, within a preselected bandwidth. For example, the frequency of the oscillator 130 output signal, in the absence of a metal object in close proximity to the metal detector arrangement 10, may be 24 kHz. The oscillator output signal is fed into the search coil 106 and the search coil 106 radiates, as an antenna, the oscillator 130 output signal. The receiver coil 116 receives the oscillator output signal as radiated by the search coil 106 and feeds it into an amplifier 132. The amplifier 132 is preferably a tuned amplifier having a known response curve for signals having frequencies within the preselected bandwidth and close to the preset frequency, $f_0$, of the oscillator 130. The amplifier 132 output information signal is fed into a rectifier, which, in the preferred embodiment of the present invention, is a half-wave voltage doubler-type rectifier for converting the AC signal from the amplifier output into a DC information signal. The rectifier 134 is connected to a switch 136 that controls the operation of the indicator 84. Thus, the amplifier 132 generates the information signal as its output and it is fed into the rectifier which rectifies the information signal and transmits the rectified information signal to the switch means 136.

The switch means 136 receives the rectified information signal and, as described below in greater detail, has a closed position for blocking the rectified information signal when the rectified information signal has a first magnitude. When the rectified information signal has a second magnitude, different from the first magnitude, the switch 136 opens allowing the power supply 72 to power the indicator 84.

As described in greater detail, the particular operating point on the response curve of the amplifier 132 that is selected controls whether the second magnitude of the rectified information signal is greater or less than the first magnitude. For example, the first magnitude of the rectified information signal may correspond to the condition when the oscillator 130 is generating its preset frequency, $f_0$, when there is no metal object in close proximity. The second magnitude of the rectified information signal may correspond to the condition where the frequency generated by the oscillator 130 has changed due to the presence of the metal object in close proximity thereto. This change may either be an increase or a decrease in the frequency in which case there may be either an increase or a decrease in the magnitude of the rectifier information signal. Further, in the preferred embodiment of the present invention, the indicator 84 generates a detectable signal that changes in proportion to the difference between the first magnitude of the rectified information signal and the second magnitude of the information signal. If the indicator 84 is a light bulb, the intensity of the visual electromagnetic radiation emitted therefrom increases in proportion to the difference between the first magnitude of the information signal and the second magnitude of the information signal increases.

Figure 7:
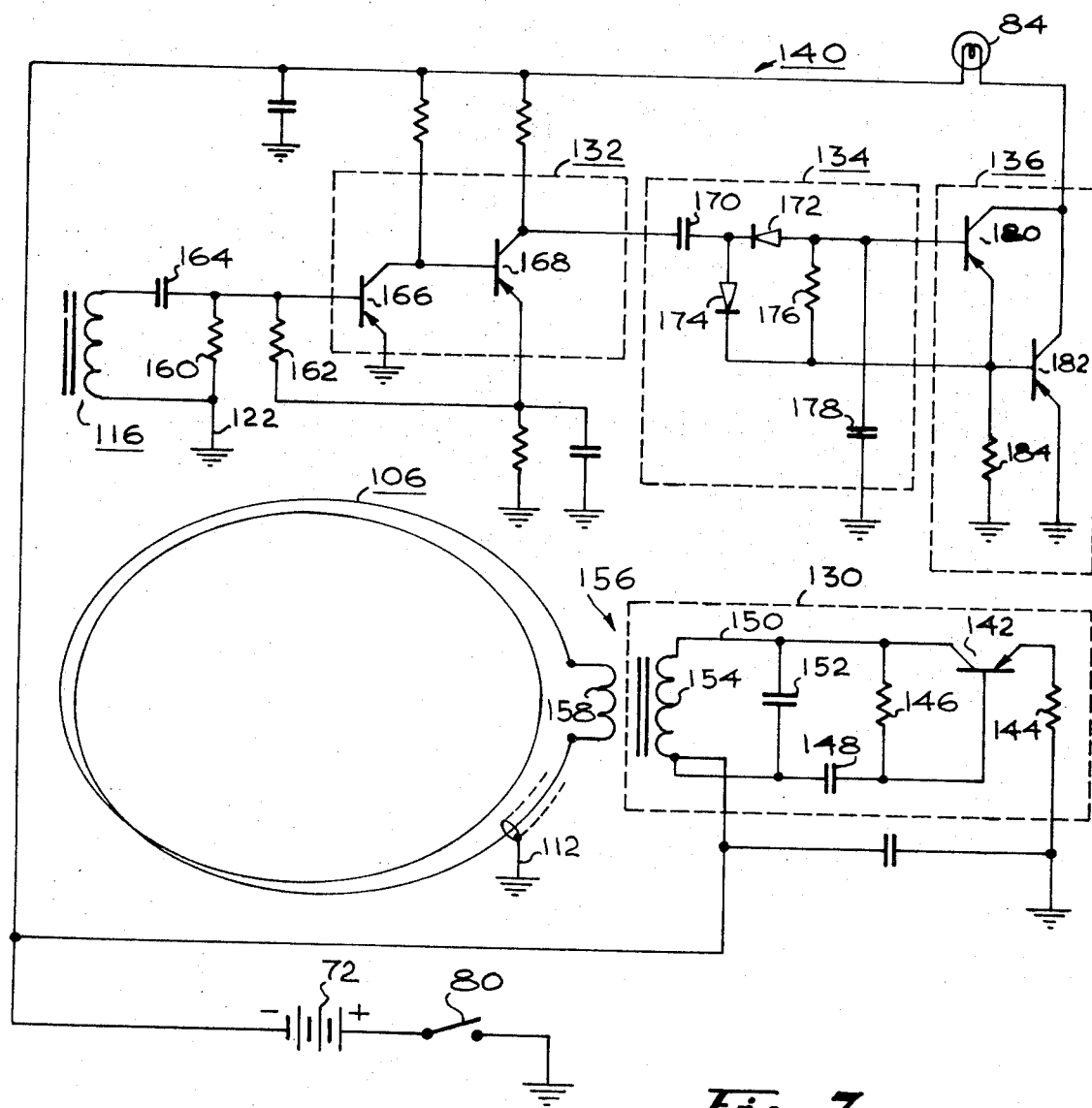
FIG. 7 is a schematic diagram of the preferred electrically operated detector circuit useful in the practice of the present invention.

FIG. 7 is a schematic diagram of the electrically operated detector circuit 140 that is shown in block diagram in FIG. 6. As shown, the oscillator 130 is comprised of a transistor 142, resistors 144 and 146 and capacitor 148. Additionally, a tank circuit 150 is part of the oscillator 130 and the tank circuit 150 is generally comprised of capacitor 152 and inductor 154. The inductor 154 may, in the preferred embodiment of the present invention, be a primary of transformer 156. The secondary 158 of the transformer 156 is connected to the search coil 106.

If a metal object is brought in proximity to the search coil 106 there is an electromagnetic coupling between the coil and the metal object which changes the output impedance of of the search coil 106 and, through the transformer action of transformer 156, changes the inductance of inductor 154. The change in the inductance of inductor 154 of the tank circuit 150 changes the frequency generated by the oscillator 130. In general, there is a slight increase in the frequency from the preset frequency, $f_0$, of the oscillator 130 to a frequency $f_1$ for the condition of the metal object in proximity to the detector arrangement 10. The amount of frequency shift depends, of course, on the change of impedance as seen by the search coil 106 and, therefore, depends upon both the mass of metal and the distance from the search coil 106 to the mass of metal. Generally, the larger the mass and/or the closer the metal object is to the search coil 106 the greater will be the change in the frequency from the preset frequency $f_0$ of the oscillator 130.

As noted above, the signal radiated by the search coil 106 is received by the receiver coil 116 that is connected through resistor 160 and 162 and capacitor 164 to the amplifier 132. The amplifier 132 is, in the preferred embodiment of the present invention, a two stage amplifier generally comprises of transistors 166 and 168. It will be appreciated, however, that many forms of amplifiers may be utilized. The amplifier 132 has a preselected response curve for signals in the range of the preset frequency $f_0$ of the oscillator 130 and generates an information signal at its output in response thereto.

The amplifier response curve as a function of frequency is shown in FIG. 8 as curve $b$. Curve $b$ illustrates the response curve of the amplifier 132 for the condition where the influence of the sensitivity control means, discussed below in greater detail, is minimal. As shown on FIG. 8, the amplifier 132 generates an information signal having an amplitude $b_0$ for the condition of the oscillator 130 generating a signal having the preset value, $f_0$. In the preferred embodiment of the present invention, the amplitude $b_0$ of the information signal generated by the amplifier 132, as rectified by rectifier 134, is insufficient to activate the switch 136 and therefore the indicator 84 is off. The magnitude of the amplifier 132 information signal necessary to cause switch 136 to conduct and thus, turn on the indicator 84 is indicated by curve $d$ on FIG. 8. However, when a metal object if brought in proximity to the search coil 106 there is generally an increase in frequency, indicated on FIG. 8 by $\Delta f$ to the frequency $f_1$. The response curve of the amplifier 132 provides a magnitude $b_1$ of the information signal for the condition of the oscillator 130 generating a signal having a frequency of $f_1$. This condition occurs, as noted, when a metal object is in proximity to the search coil 106. The magnitude $b_1$ is sufficient to activate the switch 136 to cause the indicator 84 to be energized. As can be seen from FIG. 8, when the point $b_0$ is selected as the operating point for the amplifier 132 at the condition of the oscillator 130 generating the preset frequency $f_0$, it is on the increasing side of the amplitude response curve $b$. That is, an increase in the frequency to $f_1$ of the oscillator output signal increases the magnitude of the amplifier 132 information signal output. The increase in frequency, $\Delta f$, is, of course, a function of both the mass of the metal object and the proximity thereof the metal detector arrangement 10.

If an operating point were chosen on the decreasing side of the amplifier response curve 132, then an increase in frequency of the oscillator 130 output signal would cause a decrease in the magnitude of the amplitude of the amplifier 132 output information signal. Therefore, the circuitry utilized in the present invention may provide for either an increase or a decrease in the magnitude of the amplifier 130 output information signal corresponding to an increase in the frequency of the oscillator 130 output signal and the circuitry can be suitably designed, by those skilled in the art, to provide activation of the indicator 84 depending upon which particular change occurs.

The rectified 134 shown on FIG. 7 is generally comprised of capacitor 170, diodes 172 and 174, resistor 176 and capacitor 178. While many forms of rectifiers may be utilized for receiving the information signal from the amplifier 132, the half-wave voltage doubler rectifier 134 is preferred because of the increase in signal strength obtained thereby. The rectifier 134 rectifiers the AC information signal received from the amplifier 132 and converts it into a rectified DC information signal proportional in magnitude to the magnitude of the information signal generated by the amplifier 132.

The switch means 136 is generally comprised of the two Darlington connected transistors 180 and 182 and resistor 184. As can be seen, the two Darlington connected transistors 180 and 182 control the energization of the indicator 84 by blocking the flow of the rectified information signal for the condition of a rectified information signal having a magnitude less than a preselected magnitude such as that corresponding to the magnitude $d$ shown on FIG. 8, and allowing the energization of the indicator means 84 when that magnitude is exceeded.

The indicator 84 may be any type of desired indicator providing a detectable signal such as a buzzer, light source, a meter or the like. In many applications it is preferred that the indicator 84 be a light source emitting, as a detectable signal, electromagnetic radiation in the visual portion of the electromagnetic radiation spectrum. Further, it is desired that the detectable characteristic change in response to changes in the magnitude of the rectified information signal. That is, if, for example, the indicator means 84 is a light bulb, it is preferred that the intensity thereof increase as the magnitude of the rectified information signal increases above the magnitude corresponding to the magnitude $d$ shown on FIG. 8. Therefore, the detectable signal, comprising the visual electromagnetic radiation, increases in intensity as the frequency of the oscillator 106 output signal increases, up to the maximum value obtainable as determined by the amplifier 132. It will be appreciated, of course, that the selection of components for the circuitry preferably provide that for a large mass of metal in very close proximity to the detector arrangement 10, the frequency of the oscillator 130 output signal does not increase beyond the maximum point of response curve of the amplifier 132.

If the indicator 84 in a buzzer, or other audible signal generator, then it is desired that the detectable signal emitted therefrom, for example, an audible signal, change in either intensity or frequency depending upon the magnitude of the amplifier output information signal 132 above the magnitude d.

As noted above, from the description of the preferred electrically operated detector circuit 140, shown schematically in FIG. 7, there is no "hard wire" between the oscillator 130 and the amplifier 132. That is, the oscillator output signal is emitted from the search coil 106, which radiates as an antenna, and is picked up by the receiver coil means 116. This feature, in the preferred embodiment of the present invention, allows for the unique inclusion of a sensitivity control means for varying the magnitude of the amplifier 132 information signal output without direct electrical connection therebetween.

Referring now to FIGS. 9 and 10 there is shown a preferred embodiment of a sensitivity control means, generally designated 200, useful in the practice of the present invention. Sensitivity control means 200 generally comprises the knob 92 having a projection 202 extending through an aperture 204 in the top member 16 of the case means 12. An arm means 206 is coupled to the projection 202 and has ends 206' and 206''. The knob means 92, as noted above, rotates about the axis 94 and the arm means 206 has a length a little greater than the length of the core 118 of the receiver coil means 116. An electrically conductive member 208 is coupled to the end 206' of the arm means 206. Thus, the electrically conductive member 208 is positionable by rotation of the knob 92 about the axis 94 from regions adjacent the first end 118' or second end 118'' of the core means 118 as the arm 206 is rotated into positions wherein the long dimension thereof is parallel to the axis 122 of the core means 118. This position is illustrated in FIG. 9. For the sensitivity control means 200 in this position a greater amount of the oscillator output signal radiated by the search coil 106 is concentrated in the core 118, due to the permeability and dimensions of the electrically conductive member 208.

As shown on FIG. 1, with the receiver coil means 116 aligned along the axis 122 there is a lobe-type detection pattern by the metal detector arrangement 10. That is, the lobes 210 and 212 define the areas wherein the metal detector arrangement 10 is most sensitive for detecting the presence of a metal object. Thus, these lobes 210 and 212 correspond to a position adjacent the ends 118' and 118'' respectively, of the core means 118 of the receiver coil means 116. By positioning the electrically conductive member 208 of the sensitivity control means 200 adjacent one or the other of the ends 118' and 118'' of the core means 118, there is focused therein a greater amount of the radiated oscillator output signal than occurs when the sensitivity control means is rotated 90° so that the long dimension thereof extends along the axis 214, shown in FIG. 1. This concentration of a greater amount of the radiated energy into the receiver coil means 116 increases the signal strength transmitted to the amplifier 132 by the receiver coil 120 thereby increasing the signal strength of the amplifier output information signal. This condition is illustrated as curve a in FIG. 8.

As shown, on FIG. 8, for the position of the electrically conductive member 208 adjacent either the end 118' or the end 118'' of the core 118 and for the condition of no metal object within the lobe 210 or 212 wherein the oscillator 130 is generating the preset frequency $f_0$, the amplifier 132 output information signal, has a magnitude of $a_0$. Since this magnitude $a_0$ is above the magnitude indicated by the curve d, the indicator in ON even in the presence of no metal object being present in proximity to the metal detector arrangement. However, as a metal object is brought into proximity of the metal detector 10, particularly in one of the lobes 210 or 212, there is an increase in the frequency to $f_1$ of the oscillator 130 output signal which results in an increase in the magnitude of the amplifier 132 output information signal to a value of $a_1$. Since the magnitude of the amplifier output information signal has increased to the value $a_1$, the indicator 84, for example, a bulb, glows more brightly indicating the presence of the metal. Thus, the preferred embodiment of the sensitivity control 200 shown in FIGS. 9 and 10 increases the amplitude of the amplifier output information signal for the most sensitive position.

When the arm means 206 lies along the axis 214 the response of the amplifier 132 drops back to that shown by the curve b on FIG. 8, since the electrically conductive member 208 does not couple more energy into the core 118 of the receiver coil means 116. For positions between the maximum and minimum sensitivity, the amplifier 132 information output signal will have a response curve falling between curves a and b. It has been found that for the configuration illustrated in FIGS. 9 and 10, positioning the electrically conductive member 208 in regions of approximately 15° on either side of the axis 122 provides the most sensitivity control. It will be appreciated that, depending on the permeability, size and proximity of the electrically conductive member 208 to the ends 118' or 118'' of the core 118 the point $a_0$ may be selected to fall either above or below the magnitude d.

A sensitivity control means may also be provided, according to the principles of the present invention, in which the sensitivity is decreased. That is, in the sensitivity control 200 shown in FIGS. 9 and 10, the sensitivity is increased to provide a stronger amplifier 132 output information signal compared with the strength of the signal occurring with minimum effect of the sensitivity control 200.

FIGS. 11 and 12, however, illustrate a sensitivity control, generally designated 220, useful in the practice of the present invention in which the sensitivity control is decreased and thereby decreases the magnitude of the amplifier 132 output signal compared with the magnitude of the amplifier output signal occurring with the minimum influence of the sensitivity control.

As shown in FIGS. 11 and 12, the knob means 92 has a projection 202 extending through aperture 204 in the top wall 16 of the case means 12. An electrically conductive member 222 is connected to the projection 202 and is rotated by the knob 92. In a preferred embodiment of a present invention in which the sensitivity control 220 is utilized the permeability and cross-sectional area of the electrically conductive member 222 is selected so that, for example, it may be greater than the core 118 of the receiver coil means 116. As shown on FIGS. 11 and 12, the electrically conductive member 222 has a length substantially equal to the length of the core 118 and is an elongated member generally rectangular in cross-section. It will be appreciated, though, that an desired cross-sectional area may be selected. For the electrically conductive member 222 in the position shown in FIGS. 11 and 12, that is, parallel to the axis 122, part of the oscillator 130 output signal that is radiated by the search coil 106 goes through the electrically conductive member 222 rather than through the core 118. This decreases the strength of the signal transmitted by the receiver coil 122 to the amplifier 132 thereby decreasing the magnitude of the amplifier 132 output information signal. Curve c of FIG. 8 illustrates the amplifier 132 output information signal for the condition of the elongated electrically conductive member 222 in the position shown in FIGS. 11 and 12. As shown, the magnitude of the amplifier 132 output information signal, for the condition of no metal object in proximity to the detector arrangement 10, is a magnitude $c_0$, corresponding to the oscillator 130 generating an output signal having the preset frequency $f_0$. The magnitude $c_0$ is less than the magnitude indicated by curve $d$ and therefore the indicator is OFF. However, when a metal object is placed in proximity to the detector arrangement 10, particularly within the lobes 210 or 212, there is an increase in the frequency of the oscillator 130 output signal to the value $f_1$ and this provides a magnitude $c_1$ in the amplifier 132 output information signal. Since the value $c_1$ is above the magnitude indicated by the curve $d$ the indicator is ON although the intensity of the detectable characteristic emitted thereby is comparatively low. As the electrically conductive member 222 is rotated 90°, until the long axis thereof is substantially parallel to the axis 214, there is virtually no coupling of flux into the electrically conductive member 222 and thus, there is provided the most sensitive position. For the sensitivity control means 220, the most sensitive position provides an amplifier 132 output information signal corresponding to the curve $b$ shown on FIG. 8.

Thus, each of the sensitivity control means 200 and 220 provides means for varying the amplitude of the amplifier 132 output information signal.

In operation in detecting a metal object, the sensitivity control may be placed in the maximum sensitive position so that even comparatively small objects relatively far away, will be detected. The sensitivity may then be decreased by rotating the knob 92 as the detector arrangement 10 is brought closer to the metal object so that the metal detector arrangement 10 must be closer to the object before it is detected by means of the intensity of the detectable signal emitted by the indicator 84. This process may be repeated, continually decreasing the sensitivity until the minimum sensitivity position wherein the detectable signal from the indicator 84 indicates a very close proximity of the metal object to the detector arrangement 10.

It will be appreciated that other embodiments of the present invention may incorporate other structure for providing sensitivity control. For example, FIGS. 13 and 14 illustrate a metal detector arrangement, generally designated 250, that is generally similar to the metal detector arrangement 10, and is provided with a case means 252 having a top wall 254. The case means 252 and top wall 254 are generally similar to the case means 12 and top wall 16 shown in FIG. 1. However, in this embodiment of the invention there is provided walls 256 in top wall 254 defining a slot 258 in which there is mounted a knob 260 of a sensitivity control means 262. The knob 260 moves in the slot 258 at about the axis 264.

Interior the case means 252 there is mounted a receiver coil 266 having an axis 267 that is generally similar to the receiver coil means 116 described above and is mounted on a bottom wall 268 of the case means 252. An electrically conductive member 270 is connected to the knob 260 interior the case means 262 and is moveable therewith as the knob 260 moves in the slot 258. The electrically conductive member 270 has a preselected permeability and cross-sectional area. When it is positioned adjacent the end 272' of a core 270 of the receiver coil 266 it exerts the same influence as the electrically conductive member 208 described in connection with FIGS. 9 and 10 above. Thus, the sensitivity control 260 provides an increase in the magnitude of the amplifier output information signal, such as that shown by curve $b$ of FIG. 8.

The unique structure of the present invention allows utilization of the metal detector arrangement 10 even in underwater applications. As shown on FIG. 2, the entire case means 12, either with or without the rod-like member 28, may be enclosed in, for example, a flexible transparent envelope 300, sealed at the opening 302 thereof. The flexibility of the envelope 300 allows operation of the ON-OFF switch 80 and sensitivity control knob 92. The transparency thereof allows viewing of the indicator 84 which, in such underwater applications, is a light bulb.

This concludes a description of the preferred embodiments of the present invention. It will be appreciated that those skilled in the art may find many variations and adaptations thereof. For example, the operating point on the amplifier response curve corresponding to the preset frequency $f_0$ of the oscillator may be selected on either the increasing or decreasing side thereof. The size and material of the electrically conductive member of the sensitivity control can be selected to provide any desired sensitivity variation with position. Further, both the sensitivity control means 200 and the sensitivity control means 220 could be combined in one metal detector arrangement, and independently operable, to provide sensitivity control corresponding to both curves $a$ and $c$ of FIG. 8 in one unit. Additionally, for example, a very low permeability material, such as a non-conductor could be utilized in place of the members 208 or 270 to shield the ends of the receiver coil means and thus decrease the sensitivity for the positions shown in FIGS. 9 and 13. Also, the values of the components in the detector circuit can be selected to provide variations in the response curve of the amplifier, the magnitude of the information signal necessary to activate the switch 136 to cause energization of the indicator 84, the strength of the oscillator output signal and the variations in frequency thereof in the presence of a metal object. If the magnitude of the amplifier output information signal decreases with the change in frequency of the oscillator output signal the switch 136 and/or rectifier 134 may be constructed to cause energization of the indicator 84 with decreasing signal strength. Therefore, the following claims are intended to cover all structure falling within the true scope and spirit thereof.

We claim:

1. A metal detector arrangement of the type adapted to detect the presence of a metal object and generate detectable signals in response thereto, and comprising, in combination;

a case means having peripheral walls, a top wall and a bottom wall transparent to electromagnitic radiation in a preselected bandwith and defining a cavity;

an electrically operated detector circuit mounted in said case means, and said electrically operated detector circuit comprising:

oscillator means for generating output signals having a frequency within said preselected bandwith, and said oscillator means having a metal responsive means comprising a tank circuit, and said tank circuit having an inductor and a capacitor, and said inductor comprising a primary of a transformer, and said metal responsive means varying said output signal frequency from a first frequency to other frequencies in response to the presence of the metal object in regions external said cavity;

search coil means comprising a loop antenna having a first axis and extending around said peripheral walls of said case means in said cavity and connected to said oscillator means for radiating said output signal to regions external said case means, and said search coil means coupled to the secondary of said transformer for varying the inductance of said inductor to vary the frequency of said oscillator output signal for the condition of the metal object in proximity thereto;

receiver coil means having a second axis substantially perpendicular to said first axis and said second axis substantially coplanar with said search coil, and said receiver coil positioned within said loop of said search coil means and spaced a preselected distance therefrom, said receiver coil means receiving said radiated output signal from said search coil mean;

tuned amplifier means connected to said receiver coil means for generating an information signal having a magnitude proportional to the difference between said first frequency and said other frequencies;

switch means connected to said tuned amplifier means for receiving said information signal and having an open condition for blocking said information signal for said information signal having a first magnitude, and a closed condition for transmitting said information signal for said information signal having a second magnitude different from said first magnitude;

indicator means connected to said switch means for generating the detectable signal in response to said information signal at said second magnitude;

sensitivity control means mounted on said case means in regions adjacent and spaced from said receiver coil means for varying the magnitude of said information signal; and a source of electrical energy for powering said electrically operated detector circuit.

2. The arrangement defined in claim 1 wherein:

said receiver coil further comprises an electrically conductive core means having a first permeability for electromagnetic radiation in said preselected bandwidth, and positioned along said second axis, and having a first end and a second end, and said receiver coil is wound on said core means intermediate said first end and said second end;

said first axis is substantially equidistant from said first and said second ends of said core;

said sensitivity control means is free of contact with said receiver coil and said search coil;

said case means further comprises divider walls for separating said cavity into a coil portion and a circuit portion;

said search coil, said receiver coil, and said sensitivity control means in said coil portion at said cavity; and said oscillator means, said tuned amplifier means, said switch means and said source of electrical energy in said circuit portion of said cavity.

3. The arrangement defined in claim 2 wherein:

the magnitude of said information signal increases in response to an increase in frequency of said output signal of said oscillator means.

4. The arrangement defined in claim 2 wherein:

the magnitude of said information signal decreases in response to an increase in frequency of said output signal of said oscillator means.

5. The arrangement defined in claim 2 wherein:

said search coil is a shielded electromagnetic radiation conductor;

said sensitivity control means further comprises:

a knob means mounted on said case means and manually operable from regions external said case means;

an electrically conductive member interior said case means and coupled to said knob means, and moveable by said knob with respect to said receiver coil in regions adjacent thereto;

said handle means further comprises:

a palm grip member coupled to said case means; and an elongated rod-like member detachably coupled to said case means.

6. The arrangement defined in claim 5 wherein:

said electrically conductive member of said sensitivity control means comprises an elongated member having a second permeability greater than said first permeability and having a length substantially equal to the length of said core of said receiver coil and rotatably mounted in said case means with respect to said receiver coil about said first axis, whereby said electrically conductive member decreases the magnitude of said information signal for a first position substantially parallel to said core and increases the magnitude of said information signal for second positions substantially at right angles to said core.

7. The arrangement defined in claim 2 wherein:

said search coil is a shielded electromagnetic radiation conductor;

said sensitivity control means further comprises:

a knob means rotatably mounted on said case means for rotation about said first axis;

a dielectric arm means coupled at the midpoint thereof to said knob means in said cavity, and said dielectric arm means having a length greater than the length of said core of said receiver coil;

an electrically conductive member coupled to least one end of said arm means and moveably positionable in first positions comprising regions adjacent one of said first and said second ends of said core to second positions comprising regions spaced therefrom, whereby said first positions increase the magnitude of said information signal and said second positions decrease the magnitude of said information signal;

said handle means further comprises:

a palm grip member coupled to said case means; and an elongated rod-like member detachably coupled to said case means.

8. The arrangement defined in claim 2 wherein:

said indicator means comprises a source of visual electromagnetic radiation, and the detectable signal comprises visual electromagnetic radiation;

means for changing the intensity of said visual electromagnetic radiation in response to changes in said magnitude of said information signal;

said handle means further comprises:

a palm grip member coupled to said case means; and an elongated rod-like member detachably coupled to said case means.

9. The arrangement defined in claim 8 wherein:

said visual electromagnetic radiation increases in intensity in response to increases in said magnitude in said information signal.

10. The arrangement defined in claim 2 wherein:

said indicator means comprises a source of audio energy and the detectable characteristic comprises an audible signal;

means for changing the frequency of said audible signal in response to changes in said magnitude of said information signal;

a handle means coupled to said case means and comprising:

a palm grip member coupled to said case means; and an elongated rod-like member detachably coupled to said case means.

11. The arrangement defined in claim 10 wherein:

said audio signal increases in frequency in response to increases in said magnitude of said information signal.

* * * * *